US012634730B2

(12) United States Patent
Kovács et al.

(10) Patent No.: US 12,634,730 B2
(45) Date of Patent: May 19, 2026

(54) METHOD, APPARATUS AND COMPUTER PROGRAM FOR OBTAINING INFORMATION FOR A MACHINE LEARNING-BASED FUNCTION

(71) Applicant: NOKIA TECHNOLOGIES OY, Espoo (FI)

(72) Inventors: István Zsolt Kovács, Aalborg (DK); Teemu Mikael Veijalainen, Helsinki (FI); Kalle Petteri Kela, Kaarina (FI); Jian Song, Palaiseau (FR); Muhammad Majid Butt, Naperville, IL (US)

(73) Assignee: NOKIA TECHNOLOGIES OY, Espoo (FI)

( * ) Notice: Subject to any disclaimer, the term of this patent is extended or adjusted under 35 U.S.C. 154(b) by 390 days.

(21) Appl. No.: 18/346,052

(22) Filed: Jun. 30, 2023

(65) Prior Publication Data

US 2024/0007884 A1     Jan. 4, 2024

(30) Foreign Application Priority Data

Jul. 1, 2022    (FI) ..................................... 20225620

(51) Int. Cl.
| | |
|---|---|
| *H04W 24/08* | (2009.01) |
| *G06N 3/092* | (2023.01) |
| *H04W 56/00* | (2009.01) |

(52) U.S. Cl.
CPC ............ *H04W 24/08* (2013.01); *G06N 3/092* (2023.01); *H04W 56/001* (2013.01)

(58) Field of Classification Search
None
See application file for complete search history.

(56) References Cited

U.S. PATENT DOCUMENTS

| | | | |
|---|---|---|---|
| 2020/0259896 A1* | 8/2020 | Sachs | H04L 67/12 |
| 2024/0333604 A1* | 10/2024 | Zhu | H04W 8/22 |
| 2025/0036959 A1* | 1/2025 | Iyer | G06N 3/092 |

* cited by examiner

*Primary Examiner* — Saad Khawar
(74) *Attorney, Agent, or Firm* — Carter, DeLuca & Farrell LLP

(57) ABSTRACT

An apparatus of a first communication node is provide that includes: means for synchronising a common reference timing with a second communication node; means for obtaining an indication of a time window that specifies a period of time between first and second time instances; and means for configuring a machine learning-based function at the first communication node, wherein the configuration of the machine learning-based function is common between the first and second communication nodes. The apparatus further includes means for executing the machine learning-based function; and means for obtaining information by measuring a performance metric, for the machine learning-based function, during the time window. The apparatus further includes means for assigning a time identification to the measured information during the time window, wherein the time identification is associated with the common reference timing; and means for providing, to the second communication node, the measured information according to the time identification.

11 Claims, 12 Drawing Sheets

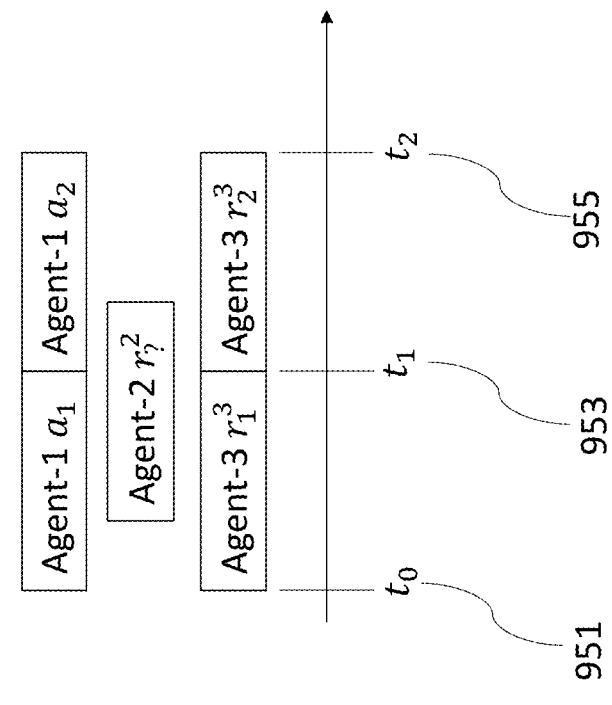
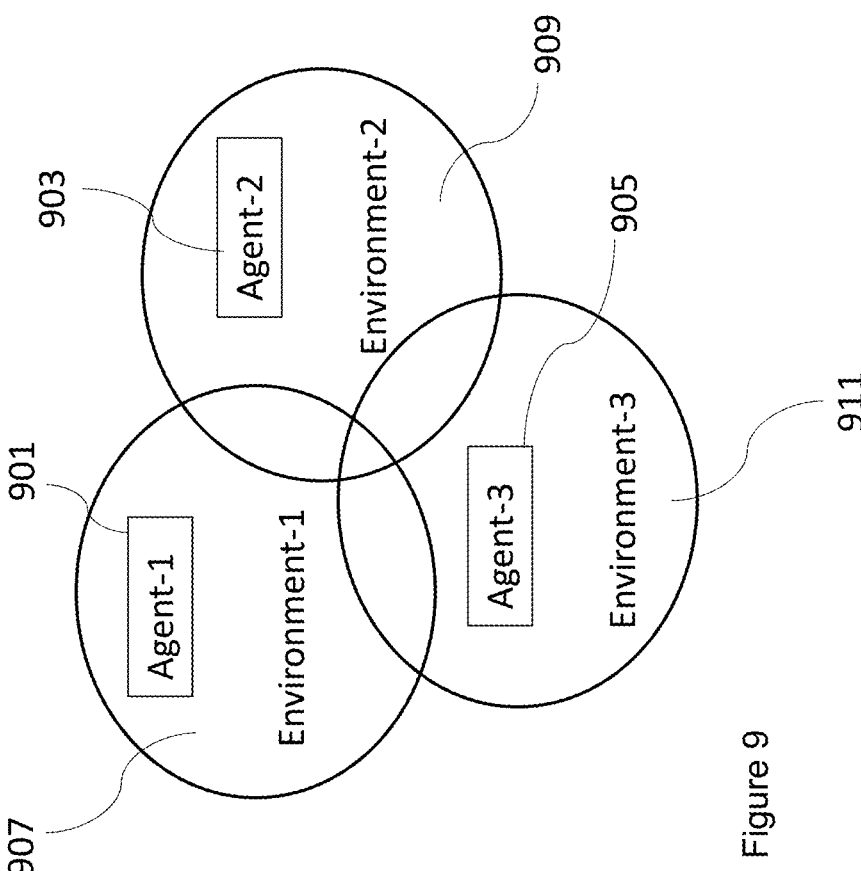
Figure 9

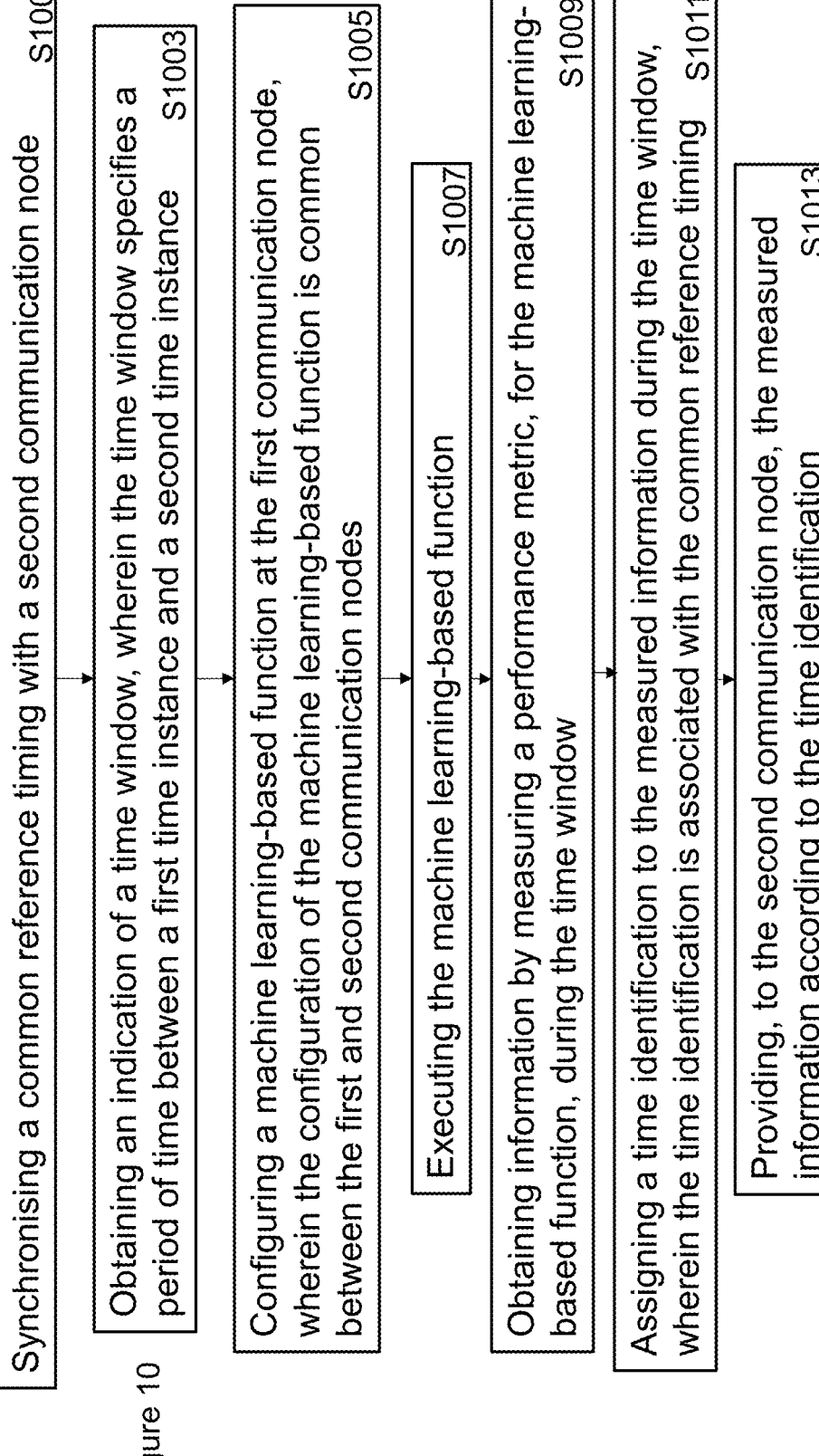

Figure 10

Synchronising a common reference timing with a second communication node    S1001

Obtaining an indication of a time window, wherein the time window specifies a period of time between a first time instance and a second time instance    S1003

Configuring a machine learning-based function at the first communication node, wherein the configuration of the machine learning-based function is common between the first and second communication nodes    S1005

Executing the machine learning-based function    S1007

Obtaining information by measuring a performance metric, for the machine learning-based function, during the time window    S1009

Assigning a time identification to the measured information during the time window, wherein the time identification is associated with the common reference timing    S1011

Providing, to the second communication node, the measured information according to the time identification    S1013

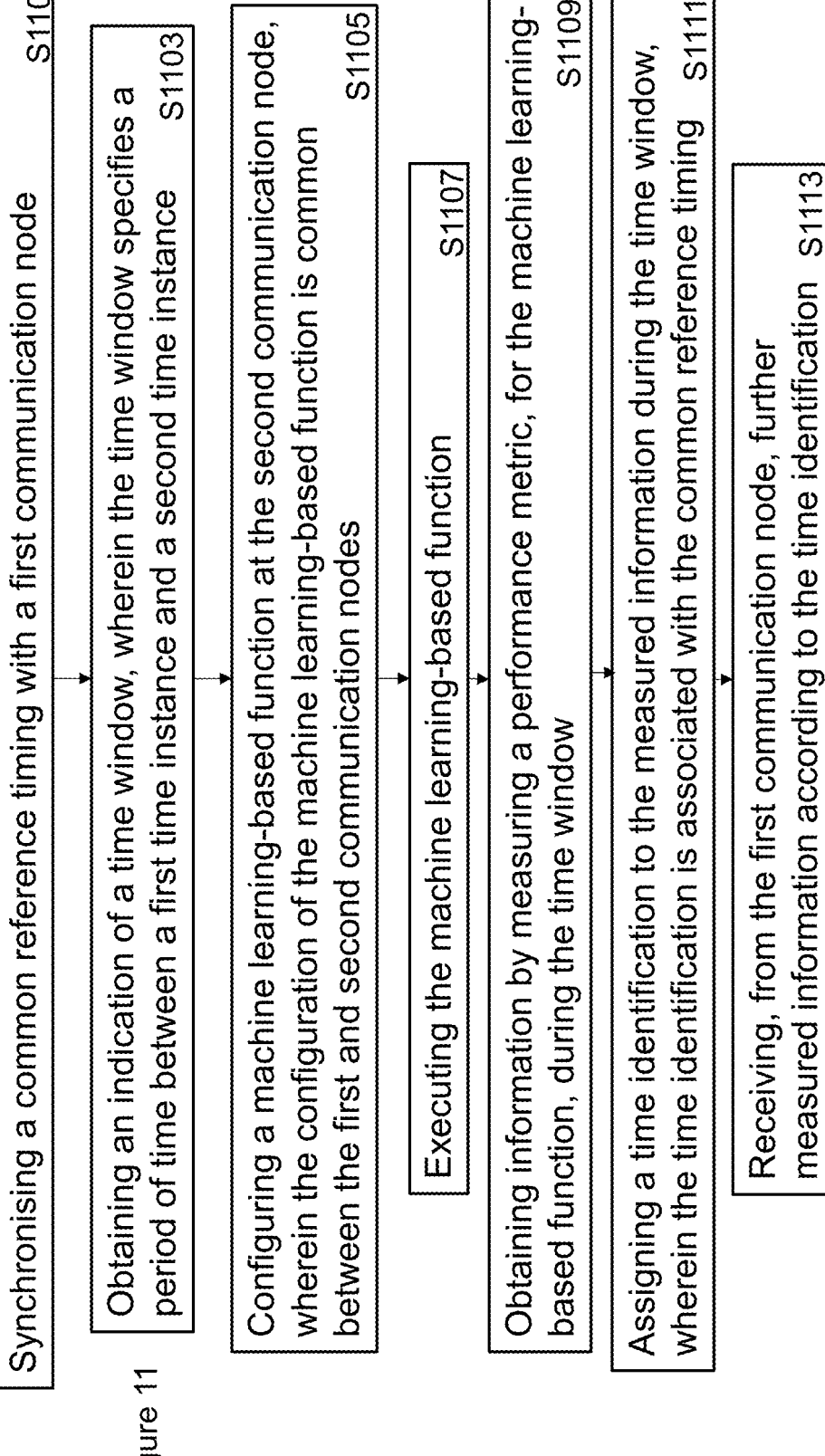

Figure 11

Synchronising a common reference timing with a first communication node     S1101

Obtaining an indication of a time window, wherein the time window specifies a period of time between a first time instance and a second time instance     S1103

Configuring a machine learning-based function at the second communication node, wherein the configuration of the machine learning-based function is common between the first and second communication nodes     S1105

Executing the machine learning-based function     S1107

Obtaining information by measuring a performance metric, for the machine learning-based function, during the time window     S1109

Assigning a time identification to the measured information during the time window, wherein the time identification is associated with the common reference timing     S1111

Receiving, from the first communication node, further measured information according to the time identification     S1113

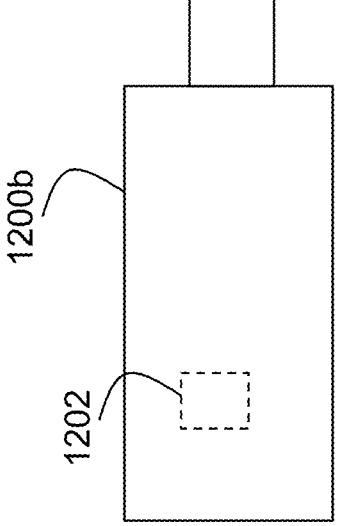
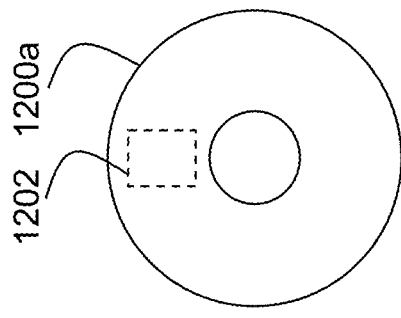
Figure 12

METHOD, APPARATUS AND COMPUTER PROGRAM FOR OBTAINING INFORMATION FOR A MACHINE LEARNING-BASED FUNCTION

CROSS-REFERENCE TO RELATED APPLICATIONS

This application claims priority to Finnish Patent Application No. 20225620, filed Jul. 1, 2022, the entire contents of which are incorporated herein by reference.

FIELD

The present application relates to a method, apparatus, and computer program for a wireless communication system.

BACKGROUND

A communication system may be a facility that enables communication sessions between two or more entities such as user terminals, base stations/access points and/or other nodes by providing carriers between the various entities involved in the communications path. A communication system may be provided, for example, by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet.

SUMMARY

According to an aspect, there is provided apparatus for a first communication node, the apparatus comprising: means for synchronising a common reference timing with a second communication node; means for obtaining an indication of a time window, wherein the time window specifies a period of time between a first time instance and a second time instance; means for configuring a machine learning-based function at the first communication node, wherein the configuration of the machine learning-based function is common between the first and second communication nodes; means for executing the machine learning-based function; means for obtaining information by measuring a performance metric, for the machine learning-based function, during the time window; means for assigning a time identification to the measured information during the time window, wherein the time identification is associated with the common reference timing; and means for providing, to the second communication node, the measured information according to the time identification.

In an example, the apparatus comprises: means for applying an action at the second time instance, wherein an effect of the action is measured by the first communication node during a subsequent time window.

In an example, the action is an action from a predetermined list of actions.

In an example, the means for providing the measured information comprises one of: means for providing, to the second communication node, the measured information with the time identification; means for providing, to the second communication node, the measured information according to a pre-defined rule associated with the time identification.

In an example, the time identification is unique to the measured information, the measured information being associated with the first and second time instances.

In an example, the apparatus comprises: means for receiving, from the second communication node, further measured information with the time identification associated with the machine learning-based function, wherein the further measured information: is measured by the communication node for the machine learning-based function, and is associated with the time window.

In an example, the apparatus comprises: means for using at least one of: the measured information, and the further measured information to execute the machine learning-based function at the first communication node.

In an example, the means for obtaining information comprises: means for obtaining the information by measuring: i) the performance metric, and ii) a state, for the machine learning-based function, during the time window.

In an example, the apparatus comprises: means for receiving, from a network node, a configuration for: i) parameters related to the machine learning-based function to be exchanged with the second communication node, ii) the time window to use, and iii) associated expected behaviour of the first communication node during the time window.

In an example, the apparatus comprises: means for configuring the machine learning-based function to execute, at the first communication node, using the time window.

In an example, the apparatus comprises: means for obtaining a guard time period associated with the time window, the guard time period defining a time period before the second time instance that measurements of the state and performance metric are to be stopped.

In an example, the apparatus comprises: means for obtaining a jitter time period associated with the time window, the jitter time period defining a time period before and after the second time instance, such that measurements of the state and performance metric performed by the network node are shorter or longer than the time window by the jitter time period.

In an example, the measured information is provided to the second communication node and/or the further measured information is received from the second communication node, during the time window.

In an example, the apparatus comprises: means for determining whether the further measured information is received during the time window; and means for, in response to determining that the further measured information is received outside of the time window, disregarding the further measured information that is received.

In an example, the apparatus comprises: means for providing, to the second communication node, the time window, such that the second communication node can operate the machine learning-based function based on the time window.

In an example, the apparatus comprises: means for synchronising the predetermined list of actions with the second communication node, when the machine learning-based function is configured at the first communication node and the second communication node.

In an example, the apparatus comprises: means for associating performance metrics with the time identification of the measured information between the first and second communication nodes, when the machine learning-based function is configured at the first communication node and the second communication node.

In an example, the apparatus comprises: means for providing, to the second communication node, the configuration for the machine learning-based function at the second communication node, wherein the configuration specifies a behaviour of the second communication node when reporting information to the first communication node, wherein the behaviour comprises at least one of: measurement types, and measurement conditions, to be applied during the reporting.

In an example, the apparatus comprises at least one of: means for providing, to the second communication node, at least one capability of the network node associated with the machine learning-based function; means for receiving, from the second communication node, at least one capability of the communication node associated with the machine learning-based function.

In an example, the common reference timing comprises a common clock.

In an example, the first communication node is a base station.

In an example, the machine learning-based function comprises a reinforcement learning-based function.

In an example, the performance metric is a reward.

According to an aspect, there is provided an apparatus, for a first communication node, the apparatus comprising: one or more processors, and memory storing instructions that, when executed by the one or more processors, cause the apparatus to perform: synchronising a common reference timing with a second communication node; obtaining an indication of a time window, wherein the time window specifies a period of time between a first time instance and a second time instance; configuring a machine learning-based function at the first communication node, wherein the configuration of the machine learning-based function is common between the first and second communication nodes; executing the machine learning-based function; obtaining information by measuring a performance metric, for the machine learning-based function, during the time window; assigning a time identification to the measured information during the time window, wherein the time identification is associated with the common reference timing; and providing, to the second communication node, the measured information according to the time identification.

In an example, the apparatus is caused to perform: applying an action at the second time instance, wherein an effect of the action is measured by the first communication node during a subsequent time window.

In an example, the action is an action from a predetermined list of actions.

In an example, the providing the measured information comprises one of: providing, to the second communication node, the measured information with the time identification; providing, to the second communication node, the measured information according to a pre-defined rule associated with the time identification.

In an example, the time identification is unique to the measured information, the measured information being associated with the first and second time instances.

In an example, the apparatus is caused to perform: receiving, from the second communication node, further measured information with the time identification associated with the machine learning-based function, wherein the further measured information: is measured by the communication node for the machine learning-based function, and is associated with the time window.

In an example, the apparatus is caused to perform: using at least one of: the measured information, and the further measured information to execute the machine learning-based function at the first communication node.

In an example, the obtaining information comprises: obtaining the information by measuring: i) the performance metric, and ii) a state, for the machine learning-based function, during the time window.

In an example, the apparatus is caused to perform: receiving, from a network node, a configuration for: i) parameters related to the machine learning-based function to be exchanged with the second communication node, ii) the time window to use, and iii) associated expected behaviour of the first communication node during the time window.

In an example, the apparatus is caused to perform: configuring the machine learning-based function to execute, at the first communication node, using the time window.

In an example, the apparatus is caused to perform: obtaining a guard time period associated with the time window, the guard time period defining a time period before the second time instance that measurements of the state and performance metric are to be stopped.

In an example, the apparatus is caused to perform: obtaining a jitter time period associated with the time window, the jitter time period defining a time period before and after the second time instance, such that measurements of the state and performance metric performed by the network node are shorter or longer than the time window by the jitter time period.

In an example, the measured information is provided to the second communication node and/or the further measured is received from the second communication node, during the time window.

In an example, the apparatus is caused to perform: determining whether the further measured information is received during the time window; and in response to determining that the further measured information is received outside of the time window, disregarding the further measured information that is received.

In an example, the apparatus is caused to perform: providing, to the second communication node, the time window, such that the second communication node can operate the machine learning-based function based on the time window.

In an example, the apparatus is caused to perform: synchronising the predetermined list of actions with the second communication node, when the machine learning-based function is configured at the first communication node and the second communication node.

In an example, the apparatus is caused to perform: associating performance metrics with the time identification of the measured information between the first and second communication nodes, when the machine learning-based function is configured at the first communication node and the second communication node.

In an example, the apparatus is caused to perform: providing, to the second communication node, the configuration for the machine learning-based function at the second communication node, wherein the configuration specifies a behaviour of the second communication node when reporting information to the first communication node, wherein the behaviour comprises at least one of: measurement types, and measurement conditions, to be applied during the reporting.

In an example, the apparatus is caused to perform at least one of: providing, to the second communication node, at least one capability of the network node associated with the machine learning-based function; receiving, from the second communication node, at least one capability of the communication node associated with the machine learning-based function.

In an example, the common reference timing comprises a common clock.

In an example, the first communication node is a base station.

In an example, the machine learning-based function comprises a reinforcement learning-based function.

In an example, the performance metric is a reward.

According to an aspect, there is provided an apparatus, for a second communication node, the apparatus comprising: one or more processors, and memory storing instructions that, when executed by the one or more processors, cause the apparatus to perform: synchronising a common reference timing with a first communication node; obtaining an indication of a time window, wherein the time window specifies a period of time between a first time instance and a second time instance; configuring a machine learning-based function at the second communication node, wherein the configuration of the machine learning-based function is common between the first and second communication nodes; executing the machine learning-based function; obtaining information by measuring a performance metric, for the machine learning-based function, during the time window; assigning a time identification to the measured information during the time window, wherein the time identification is associated with the common reference timing; and receiving, from the first communication node, the measured information according to the time identification.

In an example, the apparatus is caused to perform: applying an action at the second time instance, wherein an effect of the action is measured by the second communication node during a subsequent time window.

In an example, the action is an action from a predetermined list of actions.

In an example, the apparatus is caused to perform one of: providing, to the first communication node, the measured information with the time identification; providing, to the first communication node, the measured information according to a pre-defined rule associated with the time identification.

In an example, the time identification is unique to the measured information, the measured information being associated with the first and second time instances.

In an example, the apparatus is caused to perform: providing, to the first communication node, further measured information with the time identification associated with the machine learning-based function, wherein the further measured information: is measured by the second communication node for the machine learning-based function, and is associated with the time window.

In an example, the apparatus is caused to perform: using at least one of: the measured information, and the measured information to execute the machine learning-based function at the second communication node.

In an example, the obtaining information comprises: obtaining the information by measuring: i) the performance metric, and ii) a state, for the machine learning-based function, during the time window.

In an example, the apparatus is caused to perform: receiving, from a network node or the first communication node, a configuration for: i) parameters related to the machine learning-based function to be exchanged with the second communication node, ii) the time window to use, and iii) associated expected behaviour of the first communication node during the time window.

In an example, the apparatus is caused to perform: configuring the machine learning-based function to execute, at the second communication node, using the time window.

In an example, the apparatus is caused to perform: obtaining a guard time period associated with the time window, the guard time period defining a time period before the second time instance that measurements of the state and performance metric are to be stopped.

In an example, the apparatus is caused to perform: obtaining a jitter time period associated with the time window, the jitter time period defining a time period before and after the second time instance, such that measurements of the state and reward performed by the network node are shorter or longer than the time window by the jitter time period.

In an example, the measured information is received from the first communication node and/or the further measured is provided to the first communication node, during the time window.

In an example, the apparatus is caused to perform: determining whether the measured information is received during the time window; and, in response to determining that the measured information is received outside of the time window, disregarding the further measured information that is received.

In an example, the apparatus is caused to perform: receiving, from the first communication node, the time window, such that the second communication node can operate the machine learning-based function based on the time window.

In an example, the apparatus is caused to perform: synchronising the predetermined list of actions with the first communication node, when the machine learning-based function is configured at the first communication node and the second communication node.

In an example, the apparatus is caused to perform: associating performance metrics with the time identification of the measured information between the first and second communication nodes, when the machine learning-based function is configured at the first communication node and the second communication node.

In an example, the apparatus is caused to perform: receiving, from the first communication node, the configuration for the machine learning-based function at the second communication node, wherein the configuration specifies a behaviour of the second communication node when reporting information to the first communication node, wherein the behaviour comprises at least one of: measurement types, and measurement conditions, to be applied during the reporting.

In an example, the apparatus is caused to perform at least one of: receiving, from the first communication node, at least one capability of the network node associated with the machine learning-based function; providing, to the first communication node, at least one capability of the communication node associated with the machine learning-based function.

In an example, the common reference timing comprises a common clock.

In an example, the second communication node is a base station, a terminal, or a user equipment.

In an example, the machine learning-based function comprises a reinforcement learning-based function.

In an example, the performance metric is a reward.

According to an aspect, there is provided an apparatus for a second communication node, the apparatus comprising: means for synchronising a common reference timing with a first communication node; means for obtaining an indication of a time window, wherein the time window specifies a period of time between a first time instance and a second time instance; means for configuring a machine learning-based function at the second communication node, wherein the configuration of the machine learning-based function is common between the first and second communication nodes; means for executing the machine learning-based function; means for obtaining information by measuring a performance metric, for the machine learning-based function, during the time window; means for assigning a time identification to the measured information during the time window, wherein the time identification is associated with the common reference timing; and means for receiving, from the first communication node, the measured information according to the time identification.

In an example, the apparatus comprises: means for applying an action at the second time instance, wherein an effect of the action is measured by the second communication node during a subsequent time window.

In an example, the action is an action from a predetermined list of actions.

In an example, the apparatus comprises one of: means for providing, to the first communication node, the measured information with the time identification; means for providing, to the first communication node, the measured information according to a pre-defined rule associated with the time identification.

In an example, the time identification is unique to the measured information, the measured information being associated with the first and second time instances.

In an example, the apparatus comprises: means for providing, to the first communication node, further measured information with the time identification associated with the machine learning-based function, wherein the further measured information: is measured by the second communication node for the machine learning-based function, and is associated with the time window.

In an example, the apparatus comprises: means for using at least one of: the measured information, and the measured information to execute the machine learning-based function at the second communication node.

In an example, the means for obtaining information comprises: means for obtaining the information by measuring: i) the performance metric, and ii) a state, for the machine learning-based function, during the time window.

In an example, the apparatus comprises: means for receiving, from a network node or the first communication node, a configuration for: i) parameters related to the machine learning-based function to be exchanged with the second communication node, ii) the time window to use, and iii) associated expected behaviour of the first communication node during the time window.

In an example, the apparatus comprises: means for configuring the machine learning-based function to execute, at the second communication node, using the time window.

In an example, the apparatus comprises: means for obtaining a guard time period associated with the time window, the guard time period defining a time period before the second time instance that measurements of the state and performance metric are to be stopped.

In an example, the apparatus comprises: means for obtaining a jitter time period associated with the time window, the jitter time period defining a time period before and after the second time instance, such that measurements of the state and performance metric performed by the network node are shorter or longer than the time window by the jitter time period.

In an example, the measured information is received from the first communication node and/or the further measured is provided to the first communication node, during the time window.

In an example, the apparatus comprises: means for determining whether the measured information is received during the time window; and means for, in response to determining that the measured information is received outside of the time window, disregarding the further measured information that is received.

In an example, the apparatus comprises: means for receiving, from the first communication node, the time window, such that the second communication node can operate the machine learning-based function based on the time window.

In an example, the apparatus comprises: means for synchronising the predetermined list of actions with the first communication node, when the machine learning-based function is configured at the first communication node and the second communication node.

In an example, the apparatus comprises: means for associating performance metrics with the time identification of the measured information between the first and second communication nodes, when the machine learning-based function is configured at the first communication node and the second communication node.

In an example, the apparatus comprises: means for receiving, from the first communication node, the configuration for the machine learning-based function at the second communication node, wherein the configuration specifies a behaviour of the second communication node when reporting information to the first communication node, wherein the behaviour comprises at least one of: measurement types, and measurement conditions, to be applied during the reporting.

In an example, the apparatus comprises at least one of: means for receiving, from the first communication node, at least one capability of the network node associated with the machine learning-based function; means for providing, to the first communication node, at least one capability of the communication node associated with the machine learning-based function.

In an example, the common reference timing comprises a common clock.

In an example, the second communication node is a base station or a user equipment.

In an example, the machine learning-based function comprises a reinforcement learning-based function.

In an example, the performance metric is a reward.

According to an aspect, there is provided a method for a first communication node, the method comprising: synchronising a common reference timing with a second communication node; obtaining an indication of a time window, wherein the time window specifies a period of time between a first time instance and a second time instance; configuring a machine learning-based function at the first communication node, wherein the configuration of the machine learning-based function is common between the first and second communication nodes; executing the machine learning-based function; obtaining information by measuring a performance metric, for the machine learning-based function, during the time window; assigning a time identification to the measured information during the time window, wherein the time identification is associated with the common reference timing; and providing, to the second communication node, the measured information according to the time identification.

In an example, the method comprises: applying an action at the second time instance, wherein an effect of the action is measured by the first communication node during a subsequent time window.

In an example, the action is an action from a predetermined list of actions.

In an example, the providing the measured information comprises one of: providing, to the second communication node, the measured information with the time identification; providing, to the second communication node, the measured information according to a pre-defined rule associated with the time identification.

In an example, the time identification is unique to the measured information, the measured information being associated with the first and second time instances.

In an example, the method comprises: receiving, from the second communication node, further measured information with the time identification associated with the machine learning-based function, wherein the further measured information: is measured by the communication node for the machine learning-based function, and is associated with the time window.

In an example, the method comprises: using at least one of: the measured information, and the further measured information to execute the machine learning-based function at the first communication node.

In an example, the obtaining information comprises: obtaining the information by measuring: i) the performance metric, and ii) a state, for the machine learning-based function, during the time window.

In an example, the method comprises: receiving, from a network node, a configuration for: i) parameters related to the machine learning-based function to be exchanged with the second communication node, ii) the time window to use, and iii) associated expected behaviour of the first communication node during the time window.

In an example, the method comprises: configuring the machine learning-based function to execute, at the first communication node, using the time window.

In an example, the method comprises: obtaining a guard time period associated with the time window, the guard time period defining a time period before the second time instance that measurements of the state and performance metric are to be stopped.

In an example, the method comprises: obtaining a jitter time period associated with the time window, the jitter time period defining a time period before and after the second time instance, such that measurements of the state and performance metric performed by the network node are shorter or longer than the time window by the jitter time period.

In an example, the measured information is provided to the second communication node and/or the further measured is received from the second communication node, during the time window.

In an example, the method comprises: determining whether the further measured information is received during the time window; and in response to determining that the further measured information is received outside of the time window, disregarding the further measured information that is received.

In an example, the method comprises: providing, to the second communication node, the time window, such that the second communication node can operate the machine learning-based function based on the time window.

In an example, the method comprises: synchronising the predetermined list of actions with the second communication node, when the machine learning-based function is configured at the first communication node and the second communication node.

In an example, the method comprises: associating performance metrics with the time identification of the measured information between the first and second communication nodes, when the machine learning-based function is configured at the first communication node and the second communication node.

In an example, the method comprises: providing, to the second communication node, the configuration for the machine learning-based function at the second communication node, wherein the configuration specifies a behaviour of the second communication node when reporting information to the first communication node, wherein the behaviour comprises at least one of: measurement types, and measurement conditions, to be applied during the reporting.

In an example, the method comprises at least one of: providing, to the second communication node, at least one capability of the network node associated with the machine learning-based function; receiving, from the second communication node, at least one capability of the communication node associated with the machine learning-based function.

In an example, the common reference timing comprises a common clock.

In an example, the first communication node is a base station.

In an example, the machine learning-based function comprises a reinforcement learning-based function.

In an example, the performance metric is a reward.

According to an aspect, there is provided a method for a second communication node, the method comprising: synchronising a common reference timing with a first communication node; obtaining an indication of a time window, wherein the time window specifies a period of time between a first time instance and a second time instance; configuring a machine learning-based function at the second communication node, wherein the configuration of the machine learning-based function is common between the first and second communication nodes; executing the machine learning-based function; obtaining information by measuring a performance metric, for the machine learning-based function, during the time window; assigning a time identification to the measured information during the time window, wherein the time identification is associated with the common reference timing; and receiving, from the first communication node, the measured information according to the time identification.

In an example, the method comprises: applying an action at the second time instance, wherein an effect of the action is measured by the second communication node during a subsequent time window.

In an example, the action is an action from a predetermined list of actions.

In an example, the method comprises one of: providing, to the first communication node, the measured information with the time identification; providing, to the first communication node, the measured information according to a pre-defined rule associated with the time identification.

In an example, the time identification is unique to the measured information, the measured information being associated with the first and second time instances.

In an example, the method comprises: providing, to the first communication node, further measured information with the time identification associated with the machine learning-based function, wherein the further measured information: is measured by the second communication node for the machine learning-based function, and is associated with the time window.

In an example, the method comprises: using at least one of: the measured information, and the measured information to execute the machine learning-based function at the second communication node.

In an example, the obtaining information comprises: obtaining the information by measuring: i) the performance metric, and ii) a state, for the machine learning-based function, during the time window.

In an example, the method comprises: receiving, from a network node or the first communication node, a configuration for: i) parameters related to the machine learning-based function to be exchanged with the second communication node, ii) the time window to use, and iii) associated expected behaviour of the first communication node during the time window.

In an example, the method comprises: configuring the machine learning-based function to execute, at the second communication node, using the time window.

In an example, the method comprises: obtaining a guard time period associated with the time window, the guard time period defining a time period before the second time instance that measurements of the state and performance metric are to be stopped.

In an example, the method comprises: obtaining a jitter time period associated with the time window, the jitter time period defining a time period before and after the second time instance, such that measurements of the state and performance metric performed by the network node are shorter or longer than the time window by the jitter time period.

In an example, the measured information is received from the first communication node and/or the further measured is provided to the first communication node, during the time window.

In an example, the method comprises: determining whether the measured information is received during the time window; and, in response to determining that the measured information is received outside of the time window, disregarding the further measured information that is received.

In an example, the method comprises: receiving, from the first communication node, the time window, such that the second communication node can operate the machine learning-based function based on the time window.

In an example, the method comprises: synchronising the predetermined list of actions with the first communication node, when the machine learning-based function is configured at the first communication node and the second communication node.

In an example, the method comprises: associating performance metrics with the time identification of the measured information between the first and second communication nodes, when the machine learning-based function is configured at the first communication node and the second communication node.

In an example, the method comprises: receiving, from the first communication node, the configuration for the machine learning-based function at the second communication node, wherein the configuration specifies a behaviour of the second communication node when reporting information to the first communication node, wherein the behaviour comprises at least one of: measurement types, and measurement conditions, to be applied during the reporting.

In an example, the method comprises at least one of: receiving, from the first communication node, at least one capability of the network node associated with the machine learning-based function; providing, to the first communication node, at least one capability of the communication node associated with the machine learning-based function.

In an example, the common reference timing comprises a common clock.

In an example, the second communication node is a base station, a terminal, or a user equipment.

In an example, the machine learning-based function comprises a reinforcement learning-based function.

In an example, the performance metric is a reward.

According to an aspect, there is provided a computer program comprising computer executable instructions which when run on one or more processors perform: synchronising a common reference timing with a second communication node; obtaining an indication of a time window, wherein the time window specifies a period of time between a first time instance and a second time instance; configuring a machine learning-based function at the first communication node, wherein the configuration of the machine learning-based function is common between the first and second communication nodes; executing the machine learning-based function; obtaining information by measuring a performance metric, for the machine learning-based function, during the time window; assigning a time identification to the measured information during the time window, wherein the time identification is associated with the common reference timing; and providing, to the second communication node, the measured information according to the time identification.

According to an aspect, there is provided a computer program comprising computer executable instructions which when run on one or more processors perform: synchronising a common reference timing with a first communication node; obtaining an indication of a time window, wherein the time window specifies a period of time between a first time instance and a second time instance; configuring a machine learning-based function at the second communication node, wherein the configuration of the machine learning-based function is common between the first and second communication nodes; executing the machine learning-based function; obtaining information by measuring a performance metric, for the machine learning-based function, during the time window; assigning a time identification to the measured information during the time window, wherein the time identification is associated with the common reference timing; and receiving, from the first communication node, the measured information according to the time identification.

A computer product stored on a medium may cause an apparatus to perform the methods as described herein.

An electronic device may comprise apparatus as described herein.

In the above, various aspects have been described. It should be appreciated that further aspects may be provided by the combination of any two or more of the various aspects described above.

Various other aspects and further embodiments are also described in the following detailed description and in the attached claims.

According to some aspects, there is provided the subject matter of the independent claims. Some further aspects are defined in the dependent claims. The embodiments that do not fall under the scope of the claims are to be interpreted as examples useful for understanding the disclosure.

List of Abbreviations

AF: Application Function
AI: Artificial Intelligence
AMF: Access Management Function
AN: Access Network
BS: Base Station
CN: Core Network
CSI: Channel State Information
CU: Centralised Unit
DL: Downlink
DU: Distributed Unit
eNB: eNodeB
gNB: gNodeB
IIoT: Industrial Internet of Things
LTE: Long Term Evolution
NEF: Network Exposure Function
NG-RAN: Next Generation Radio Access Network
NF: Network Function
NLOS: Near Line of Sight
NR: New Radio
NRF: Network Repository Function
NW: Network
MAC: Medium Access Control
MDP: Markov Decision Process
ML: Machine Learning
MS: Mobile Station
OAM: Operations, Administration and Maintenance
PCF Policy Control Function
PLMN: Public Land Mobile Network
QoS: Quality of Service
RAN: Radio Access Network
RF: Radio Frequency
RL: Reinforcement Learning
RRC: Radio Resource Control
RRM: Radio Resource Management
SMF: Session Management Function
UE: User Equipment
UDR: Unified Data Repository
UDM: Unified Data Management
UL: Uplink
UPF: User Plane Function
3GPP: $3^{rd}$ Generation Partnership Project
5G: $5^{th}$ Generation
5GC: 5G Core network
5G-RAN: 5G Radio Access Network
5GS: 5G System

DESCRIPTION OF FIGURES

Embodiments will now be described, by way of example only, with reference to the accompanying Figures in which:

FIG. 9 shows a schematic representation of multi-agent synchronisation;

FIG. 10 shows an example method flow diagram performed by a network entity;

FIG. 11 shows another example method flow diagram performed by a communication node; and FIG. 12 shows a schematic representation of a non-volatile memory medium storing instructions which when executed by a processor allow a processor to perform one or more of the steps of the method of FIGS. 10 and 11.

DETAILED DESCRIPTION

Before explaining in detail some examples of the present disclosure, certain general principles of a wireless communication system and mobile communication devices are briefly explained with reference to FIGS. 1 to 3 to assist in understanding the technology underlying the described examples.

Figure 1:
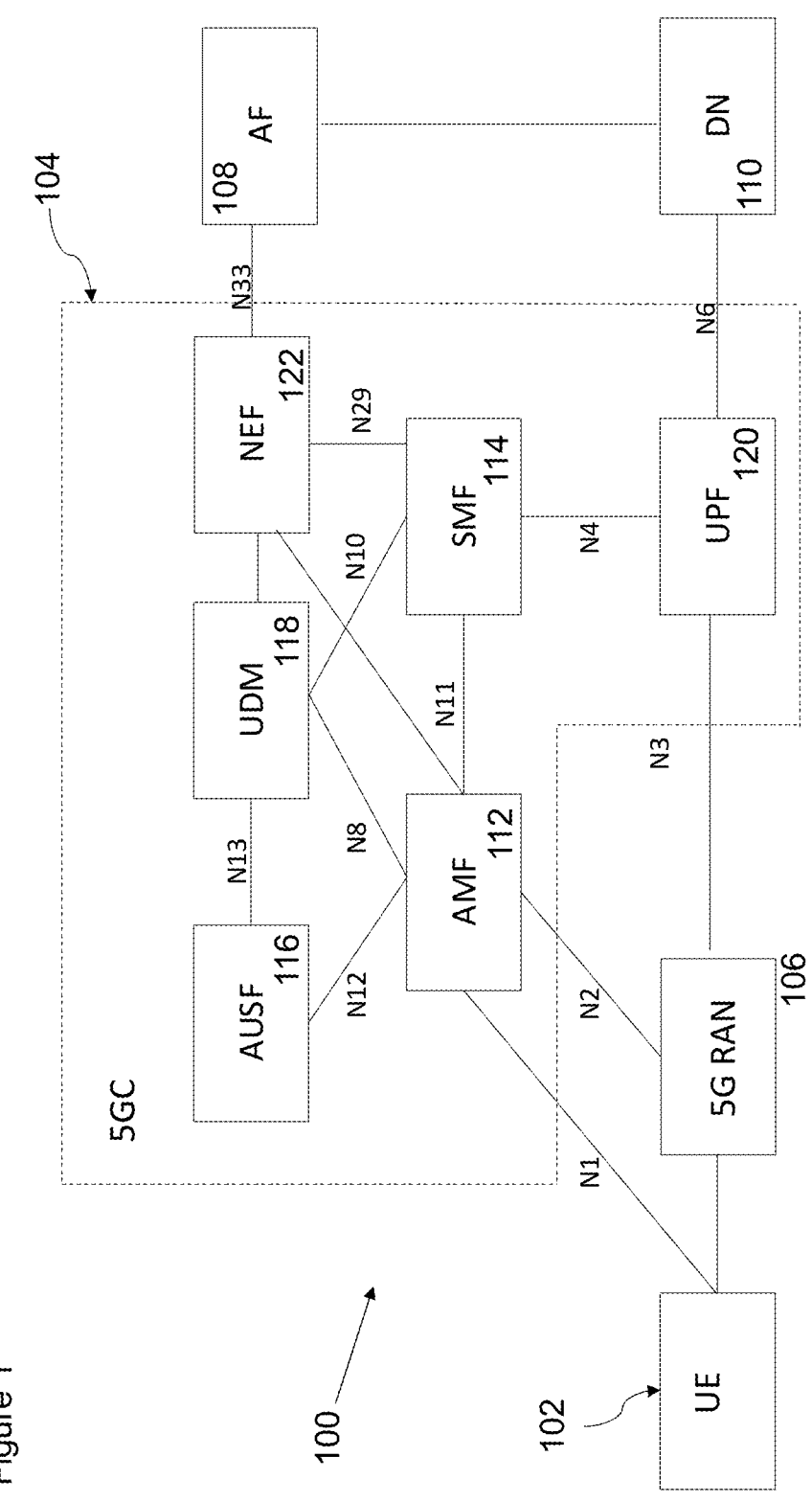
FIG. 1 shows a schematic representation of a 5G system.

In a wireless communication system 100, such as that shown in FIG. 1, mobile communication devices/terminals or user apparatuses, and/or user equipments (UE), and/or machine-type communication devices 102 are provided wireless access via at least one base station (not shown) or similar wireless transmitting and/or receiving node or point. A communication device is provided with an appropriate signal receiving and transmitting apparatus for enabling communications, for example enabling access to a communication network or communications directly with other devices. The communication device may access a carrier provided by a station or access point, and transmit and/or receive communications on the carrier.

In the following certain examples are explained with reference to mobile communication devices capable of communication via a wireless cellular system and mobile communication systems serving such mobile communication devices. Before explaining in detail the examples of disclose, certain general principles of a wireless communication system, access systems thereof, and mobile communication devices are briefly explained with reference to FIGS. 1, 2 and 3 to assist in understanding the technology underlying the described examples.

FIG. 1 shows a schematic representation of a 5G system (5GS) 100. The 5GS may comprises a device 102 such as user equipment or terminal, a 5G access network (5G-RAN) 106, a 5G core network (5GC) 104, one or more network functions (NF), one or more application function (AF) 108 and one or more data networks (DN) 110.

The 5G-RAN 106 may comprise one or more gNodeB (gNB) distributed unit functions connected to one or more gNodeB (gNB) centralized unit functions.

The 5GC 104 may comprise an access management function (AMF) 112, a session management function (SMF) 114, an authentication server function (AUSF) 116, a user data management (UDM) 118, a user plane function (UPF) 120, a network exposure function (NEF) 122 and/or other NFs.

Some of the examples as shown below are applicable to 3GPP 5G standards. Some of the examples as shown below are also applicable to 6G and beyond, generation cellular systems.

However, some examples may also be applicable to 4G, 3G and other 3GPP standards.

In a communication system, such as that shown in FIG. 1, mobile communication devices/terminals or user apparatuses, and/or user equipments (UE), and/or machine-type communication devices are provided with wireless access via at least one base station or similar wireless transmitting and/or receiving node or point. The terminal is provided with an appropriate signal receiving and transmitting apparatus for enabling communications, for example enabling access to a communication network or communications directly with other devices. The communication device may access a carrier provided by a station or access point, and transmit and/or receive communications on the carrier.

Figure 2:
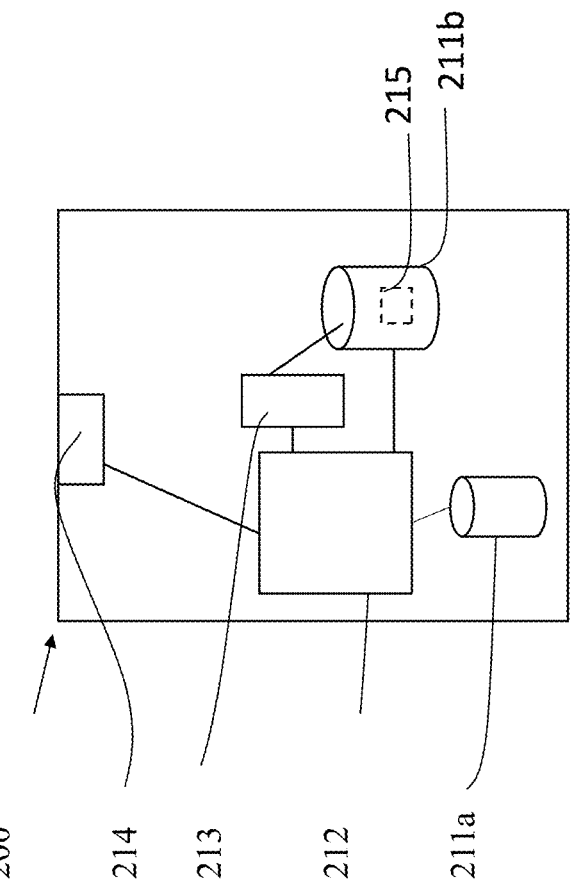
FIG. 2 shows a schematic representation of a control apparatus.

FIG. 2 illustrates an example of a control apparatus 200 for controlling a function of the 5G-RAN or the 5GC as illustrated on FIG. 1. The control apparatus may comprise at least one random access memory (RAM) 211*a*, at least on read only memory (ROM) 211*b*, at least one processor 212, 213 and an input/output interface 214. The at least one processor 212, 213 may be coupled to the RAM 211*a* and the ROM 211*b*. The at least one processor 212, 213 may be configured to execute an appropriate software code 215. The software code 215 may for example allow to perform one or more steps to perform one or more of the present aspects. The software code 215 may be stored in the ROM 211*b*. The control apparatus 200 may be interconnected with another control apparatus 200 controlling another function of the 5G-RAN or the 5GC. In some examples, each function of the 5G-RAN or the 5GC comprises a control apparatus 200. In alternative examples, two or more functions of the 5G-RAN or the 5GC may share a control apparatus.

Figure 3:
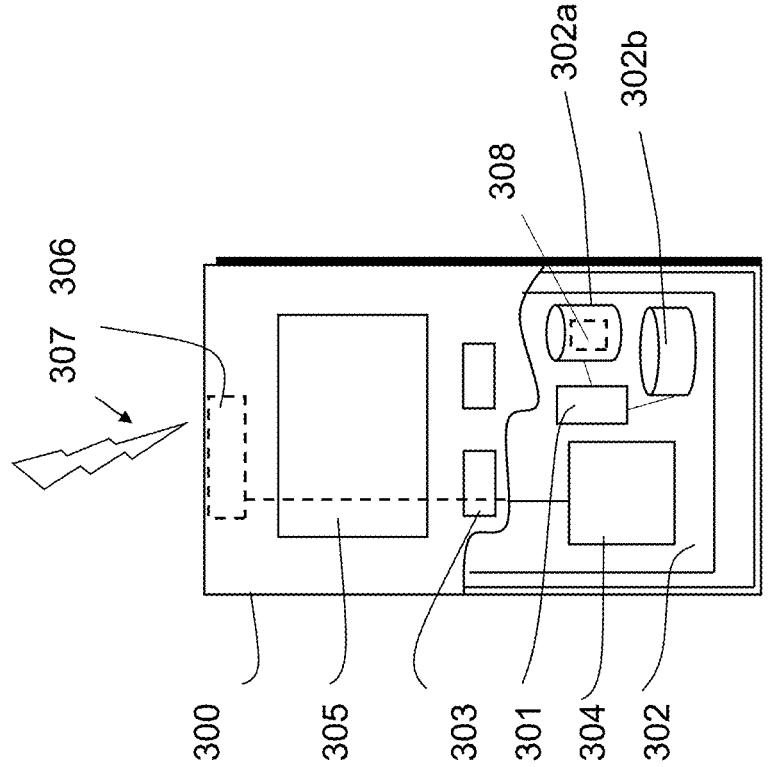
FIG. 3 shows a schematic representation of a terminal.

FIG. 3 illustrates an example of a terminal 300, such as the terminal illustrated on FIG. 1. The terminal 300 may be provided by any device capable of sending and receiving radio signals. Non-limiting examples comprise a user equipment, a mobile station (MS) or mobile device such as a mobile phone or what is known as a 'smart phone', a computer provided with a wireless interface card or other wireless interface facility (e.g., USB dongle), a personal data assistant (PDA) or a tablet provided with wireless communication capabilities, a machine-type communications (MTC) device, a Cellular Internet of things (CIoT) device or any combinations of these or the like. The terminal 300 may provide, for example, communication of data for carrying communications. The communications may be one or more of voice, electronic mail (email), text message, multimedia, data, machine data and so on.

The terminal 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the mobile device.

The terminal 300 may be provided with at least one processor 301, at least one memory ROM 302*a*, at least one RAM 302*b* and other possible components 303 for use in software and hardware aided execution of tasks it is designed to perform, including control of access to and communications with access systems and other communication devices. The at least one processor 301 is coupled to the RAM 302*a* and the ROM 302*a*. The at least one processor 301 may be configured to execute an appropriate software code 308. The software code 308 may for example allow to perform one or more of the present aspects. The software code 308 may be stored in the ROM 302*a*.

The processor, storage and other relevant control apparatus may be provided on an appropriate circuit board and/or in chipsets. This feature is denoted by reference 304. The device may optionally have a user interface such as keypad 305, touch sensitive screen or pad, combinations thereof or the like. Optionally one or more of a display, a speaker and a microphone may be provided depending on the type of the device.

One or more of the following examples may be applicable in the context of artificial intelligence (AI) and machine learning (ML) techniques applied to 3GPP radio access network (RAN) and radio resource management (RRM) procedures.

Current NR specifications work for Release 18 in 3GPP is planned under the approved study item on "AI/ML for air interface", namely RP-213559. Some of the example initial uses cases to be considered in the study item phase are:

i) Channel state information (CSI) feedback enhancement. For example, an overhead reduction, improved accuracy, prediction.

ii) Beam management. For example, beam prediction in time, and/or spatial domain for overhead and latency reduction, beam selection accuracy improvement.

iii) Positioning accuracy enhancements for different scenarios including, for example, those with heavy near line-of-sight (NLOS) conditions.

One of the key expected outcomes of the study item is "The AI/ML approaches for the selected sub use cases need to be diverse enough to support various requirements on the gNB-UE collaboration levels" One or more of the following examples aims to address intra-RAN collaboration (within the same RAN) aspects, wherein both source and destination RAN nodes are expected to execute certain RL-based/ML-based functionalities (physical/medium access control, RRM, etc.). RAN nodes may include base stations (gNB) and UEs.

Reinforcement learning (RL) is a sub-area of ML that is concerned with how intelligent 'agents' ought to take actions in an environment in order to maximize the notion of cumulative 'reward'. The reward is a type of performance metric. RL is one of three basic machine learning paradigms, alongside supervised learning and unsupervised learning. In RL, the focus is on finding a balance between exploration (of uncharted territory) and exploitation (of current knowledge). The environment is typically stated in the form of a Markov decision process (MDP), because many RL algorithms for this context use dynamic programming techniques. The purpose of reinforcement learning is for the 'agent' to learn an optimal, or nearly-optimal, policy that maximizes the "reward function" or other user-provided reinforcement signal that accumulates from the immediate rewards.

Figures 4A, 4B:
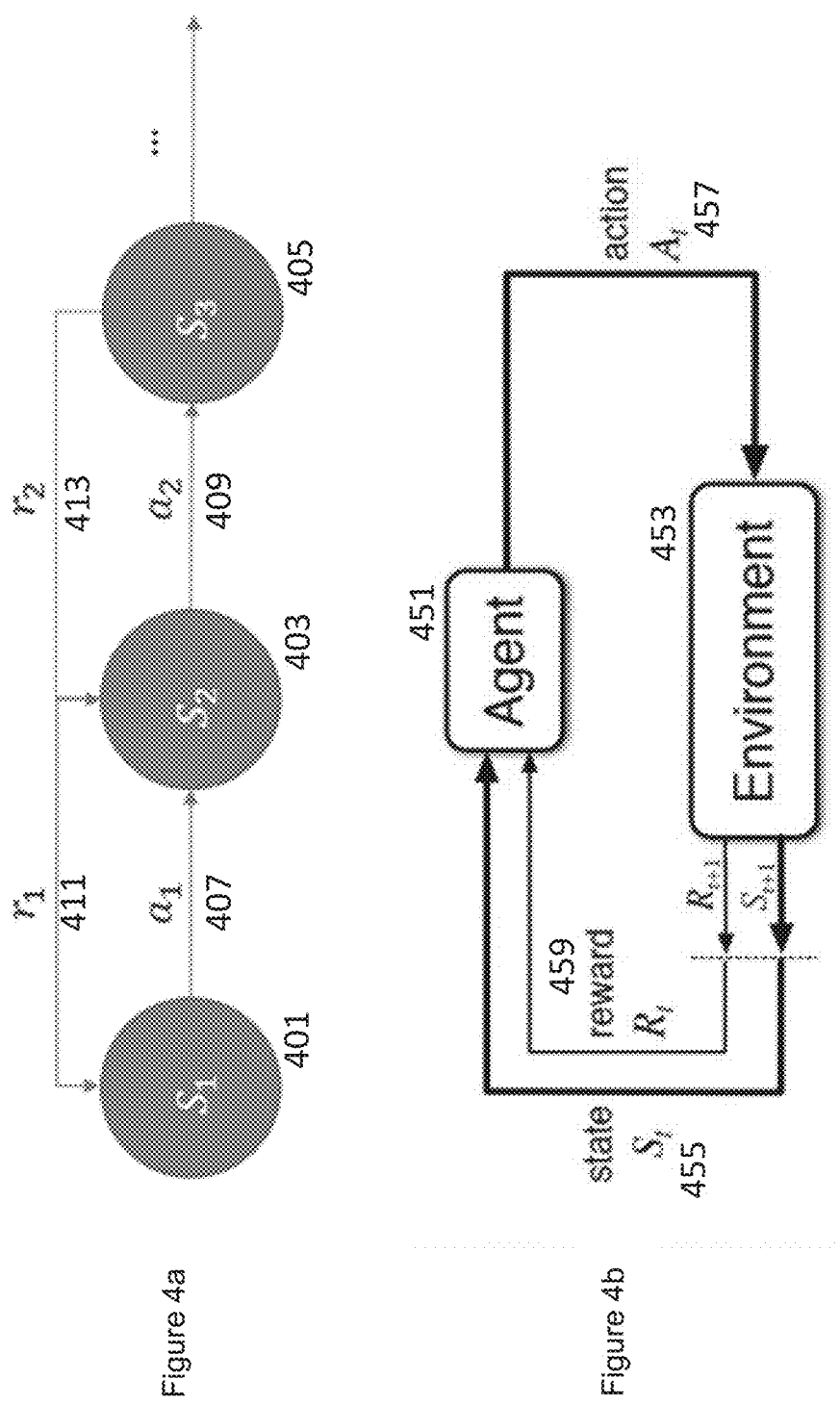
FIG. 4*a* shows a schematic representation of reinforcement learning state transition with a Markov decision process.
FIG. 4*b* shows another schematic representation of reinforcement learning state transition.

FIGS. 4*a* and 4*b* show the basic principle of RL. RL learns by interacting with the environment by applying an action in a given state, moving to a new state as results of the action, and measuring a reward (outcome) of the action. A goal of the RL is to maximize the expected cumulative reward. For instance, Deep-RL is typically modelled so that a neural network is used to solve a hidden MDP. In practice, this typically means that the interactions between the agent and the environment happens with discrete time steps, and each time step results a new state, action and reward.

FIG. 4*a* shows a schematic representation of RL state transitions with a Markov decision process.

In FIG. 4*a*, there is a first state 401, which is labelled s1. There is also a second state 403, which is labelled s2. There is also a third state 405, which is labelled s3. After the first state 401, a first action 407 is performed, which leads to the second state 403. After the second state 403, a second action 409 is performed, which leads to the third state 405.

A first reward 411 is measured during the time of the transition from the first state 401 and the second state 403 A second reward 413 is measured during the time of the transition from the second state 403 and the third state 405

FIG. 4*b* shows another schematic representation of an RL state transition. There is provided an agent 451, which is the learner and decision-maker. An environment 453 is the entity that the agent 451 interacts with. The environment 453 comprises everything outside the agent 451. The agent 451 and the environment 453 interact continually, the agent selecting actions and the environment responding to those actions and presenting new situations to the agent.

The agent 451 and environment 453 interact at each of a sequence of discrete time steps, t=0, 1, 2, 3 . . . . At each time step, the agent 451 receives a representation of the environment's state 455. On that basis, the agent 451 selects an action 457, wherein there is the set of actions available in that state 455. One time step later, in part as a consequence of its action 457, the agent 451 receives a reward 459, and finds itself in a new state.

There are multiple examples of ML-based algorithms for the NG-RAN that offer various radio resource management (RRM) improvements. As many of those ML-based RRM algorithms are executed and distributed at NW-side, such as packet scheduling, link adaptation, beam management, etc., in many instances the corresponding ML/RL agents are deployed at each gNB to capture the individual cell performance. In this sense, a resulting problem is with the property of multi-agent independent learning mechanisms, which may potentially cause undesired radio interference, optimization objective conflicts, and quality of service (QoS) degradation.

However, such ML/RL-based algorithms are typically executed per cell, wherein each gNB behaves as an independent learning agent to perform joint exploration and exploitation at the same time scale. This creates further conflicts during the warm-up/exploration phase and more random actions are to be taken at each agent, which results in the undesired performance degradation in cell throughput. This is mainly due to the impact of every single action towards neighbouring cells and agents is unknown. This implies that, in a multi-agent setting, when the independent ML-agents (e.g., ML in gNB) share the environment in which they operate, some level of coordination and control would be beneficial for the agents to understand the influence of their actions. For example, there may be interference generated by a first base station that will influence the performance of a neighbouring second base station, and vice versa. It would be beneficial if the first and second base station could understand how to influence each other, in order to adjust their behaviour accordingly.

It is therefore desirable to provide a coordinated ML/RL approach that, not only accounts for online adaptation and optimization of UE radio parameters in the serving cell, but also preserves neighbouring cells' QoS requirement. For a correct ML/RL operation (training and inference (for ML/AI), or exploration and exploitation (for RL)) shared information can be used as part of a reward or state definition, and can be mapped to a desired time period. For example, in RL, if rewards cannot be accurately associated with taken actions in certain states, they become 'noisy' which may have consequences to the learning of the RL algorithm.

One or more of the following examples aims to address one or more of the problems identified above. In one or more examples, there is provided a method for an exchange of reward between network entities, that can be mapped to a certain period of time. The method is also applicable to supervised learning, whereby cost function metrics (or simply, cost metrics) are exchanged, and can be mapped to certain period of time. The rewards/cost metrics may be mapped at a source node, including the requirements on how to use it at a target/receiver node. The rewards and cost metrics may be referred to as performance metrics. Performance metrics are a part of many ML pipelines. Performance metrics may be used to determine whether there is any progress with the ML function, and puts a number on it.

In some examples, in addition to time information (e.g. timestamps) being provided in each message exchange between source and target nodes, the source and target nodes include, explicitly in the exchanged messages, RL/ML parameters that may be used by each node for coordinated operation. In some examples, it can be assumed that basic time synchronisation is implemented in the network, for example between gNBs, and between gNBs and UEs. Furthermore, delays on the Xn and/or F1 interfaces may be assumed to be negligible with respect to operating time periods (time steps) of the RL-based functions that are included in one or more of the following examples.

For inter-gNB collaboration, when information is exchanged over the Xn or F1 interfaces, the following synchronisation steps occur:

i) A source node configures a selected target node with a reporting periodicity and a time window, used to estimate/calculate the selected shared information (such as, for example, throughput, latency). The configuration information for the nodes, which need to operate in collaborative mode, may be received from operations, administration and maintenance (OAM), or an ML-orchestrator (MLO) entity.

ii) The source node and the target node provide time information/time stamps for their shared information.

iii) The source node specifies the behaviour of the target node during the reporting periodicity and time window. The behaviour of the target node may be specified in terms of measurement types and/or measurement conditions to be applied during the reporting period. For example, the source node may request, 'no changes to parameter X' and/or 'no changes to parameter X and report Y-percentile value for measurements of parameter Z'.

It is submitted that this mechanism is equally applicable for base station to UE/terminal communications. For gNB-UE collaboration, when information is exchanged over the Uu interface, the same mechanisms are proposed as for the inter-gNB collaboration.

In examples, the mechanisms above for inter-gNB collaboration and/or gNB-UE collaboration may be implanted when an RL-based function is operating in exploration mode. However, when the RL-based function is operating in exploitation mode, the synchronization requirements may be relaxed. This may be the case when new training data is not collected for the RL-based function. Alternatively, when RL/ML does not require state information from a neighbour gNB. For example, larger time periods may be used between message exchanges and/or more reporting jitter can be configured (tolerated) in order to relax the synchronization requirements.

These mechanisms will be discussed in more detail below.

The following example includes a source (communication) node and a target (communication) node. The source and target nodes may be 'coupled' in terms of radio environment characteristics and resource management actions. The source node and target node may also be neighbouring nodes, in some examples. In this context, neighbouring nodes may mean that the nodes are similar in terms of their radio conditions. For example, in terms of interference coupling between the nodes. The source node and target node may both be gNBs. In other examples, the source node is a gNB, and the target node is a UE or other suitable communication node.

For each pair of source and target nodes, the following configuration/signalling steps may be performed as follows:

In a first step of the example, the source and target nodes synchronise to a common reference timing. For example, the common timing may be a global navigation satellite system (GNSS) timing, a single frequency network (SFN) timing, or any other suitable timing. The time may be an absolute time indicator with a certain precision. For example, coordinated universal time (UTC) time with 1 ms precision, or can be relative to the initial synchronisation time (epoch) and based on a counter with a certain incrementation step. An epoch or reference epoch is an instant in time chosen as the origin of a particular calendar era.

In a further step, the source and target nodes exchange information about their machine learning capabilities. The capabilities may be related to a RL-based function.

In a further step, the source and target nodes obtain a definition of a time window, w. The time window specifies a period of time (length of time) between two time instances. The length of time specified by the time window may depend on specifics of the RL-based function. The time window may be provided to the source and target nodes from operations, administration, maintenance (OAM)/ML-orchestrator (MLO). The time window may be determined by the source node, which provides the time window to the target node. When the time window is determined by the source node, any node in the network can act as source node and may do this autonomously. In some examples, default configurations of the time window are made available in both source and target node. For example, from OAM/MLO, or from the capability exchange procedure described above. The time window will be discussed in more detail below alongside FIG. 5.

In a further step, the source and target node (internally) configure their RL-based function operation to operate based on a plurality of time instances t_n. The delta between two consecutive time instances defines the length of the window w. The configuration may include a length (or number of) time instances to run the RL-based function for. The configuration of the RL-based function may include a configuration for actions, state transitions, and reward evaluation (performance metric evaluation).

In some examples, the source node specifies the configuration/behaviour of the target node in terms of measurement types and/or measurement conditions to be applied during the previously configured time window. For example, the behaviour may specify 'no changes to parameter X' and/or 'no changes to parameter X and report Y-percentile value for measurements of parameter Z'. In other examples, the behaviour is specified in the default configuration.

In a further step, the source and target nodes execute the RL-based functions that have been configured. Each node applies their actions, $a_n$, at the time instance $t_n$. Each node measures a state for an during the time window before the action $a_n$ was performed. Each node estimates/measures a reward value during time widow $w_n$. This is illustrated in FIG. 5.

Figure 5:
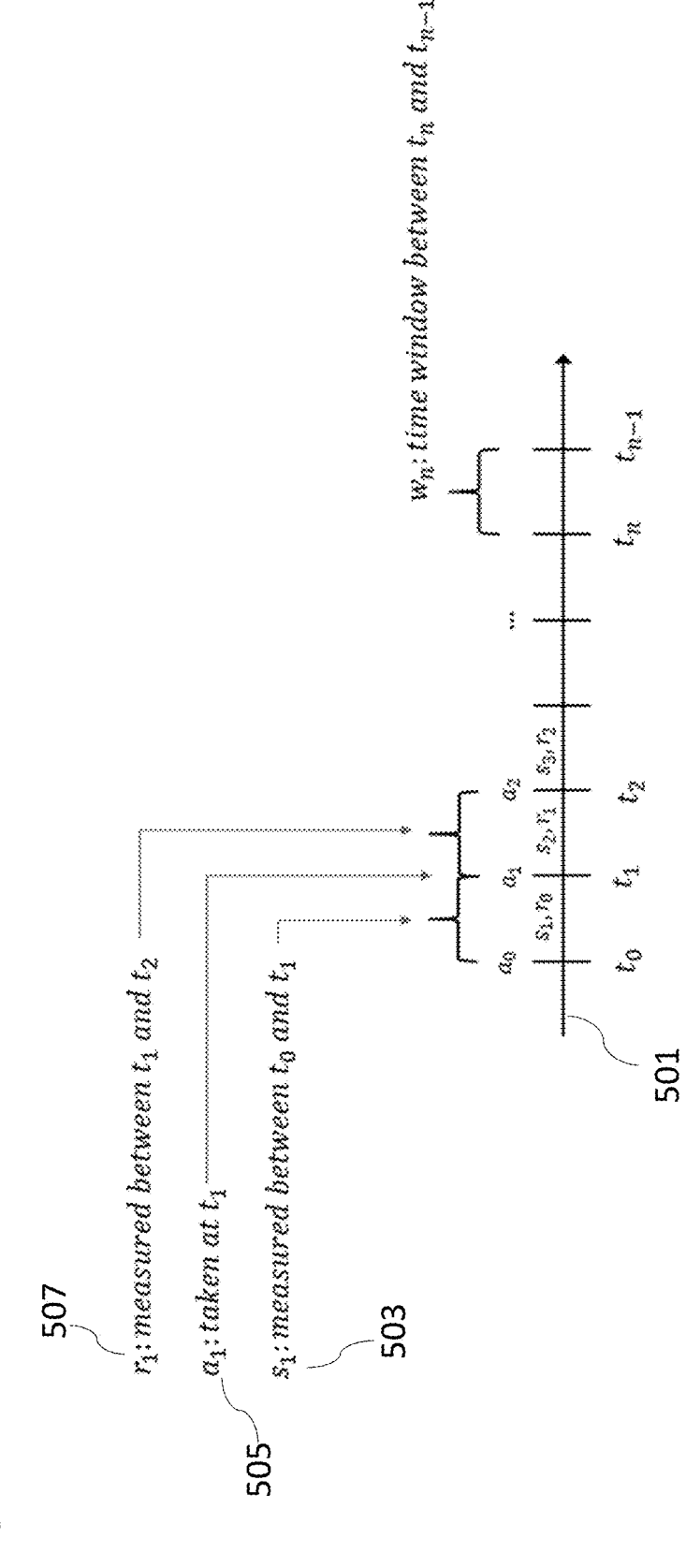
FIG. 5 shows a schematic representation of timings associated with a reinforcement learning-based function.

FIG. 5 shows a schematic representation of timings associated with the reinforcement learning-based function. FIG. 5 shows a timeline 501 running from to to $t_{n-1}$. Between $t_0$ and $t_1$ a first state $s_1$ 503 is measured by a node. At $t_1$ a first action $a_1$ 505 is taken by the node. The first action 505 may be made from a list of predetermined actions. The predetermines actions may be specific in the RL-based function configuration. The first action 505 may be chosen based on the measured first state 503. A first reward $r_1$ 507 is measured by the node between $t_1$ and $t_2$. A time window $w_n$ defines a length of time between two (adjacent) time instances.

In a further step, for the measurements performed by the source node, the source node will associate/assign a time identification (ID) to these measurements. For the measurements performed by the target node, the target node will associate/assign a time identification (ID) to these measurements. In some examples, the source and target nodes will assign the same time ID to measurements performed at the same time. For example, at $t_2$ the source node measures data and assigns a time ID of 'xyz'. For any measured data at the target node, the target node will also assign a time of ID to this data of 'xyz'. In this way, a common identification of the data, with reference to time, is achieved at the source and target nodes. In another example, the nodes may use IDs based on real time (e.g. in a similar manner to two-factor authentication keys).

In some examples, an individual time ID will be assigned to each state, action, and reward.

In a further step, the source and target nodes exchange the measured information associated with the RL-based function. Each measurement may be provided alongside the assigned time ID. The measurements may be exchanged at every time instance. In this way, the time window will determine how often the measurements are exchanged between nodes. For example, at $t_1$ the $s_1$ measurements are exchanged, and at $t_2$ the $s_2$ measurements and $r_1$ measurements are exchanged.

In some other examples, one or more of the above steps may not be performed by either, or both, of the source and target nodes. Furthermore, one or more of the above steps may be performed in different orders.

Figure 6:
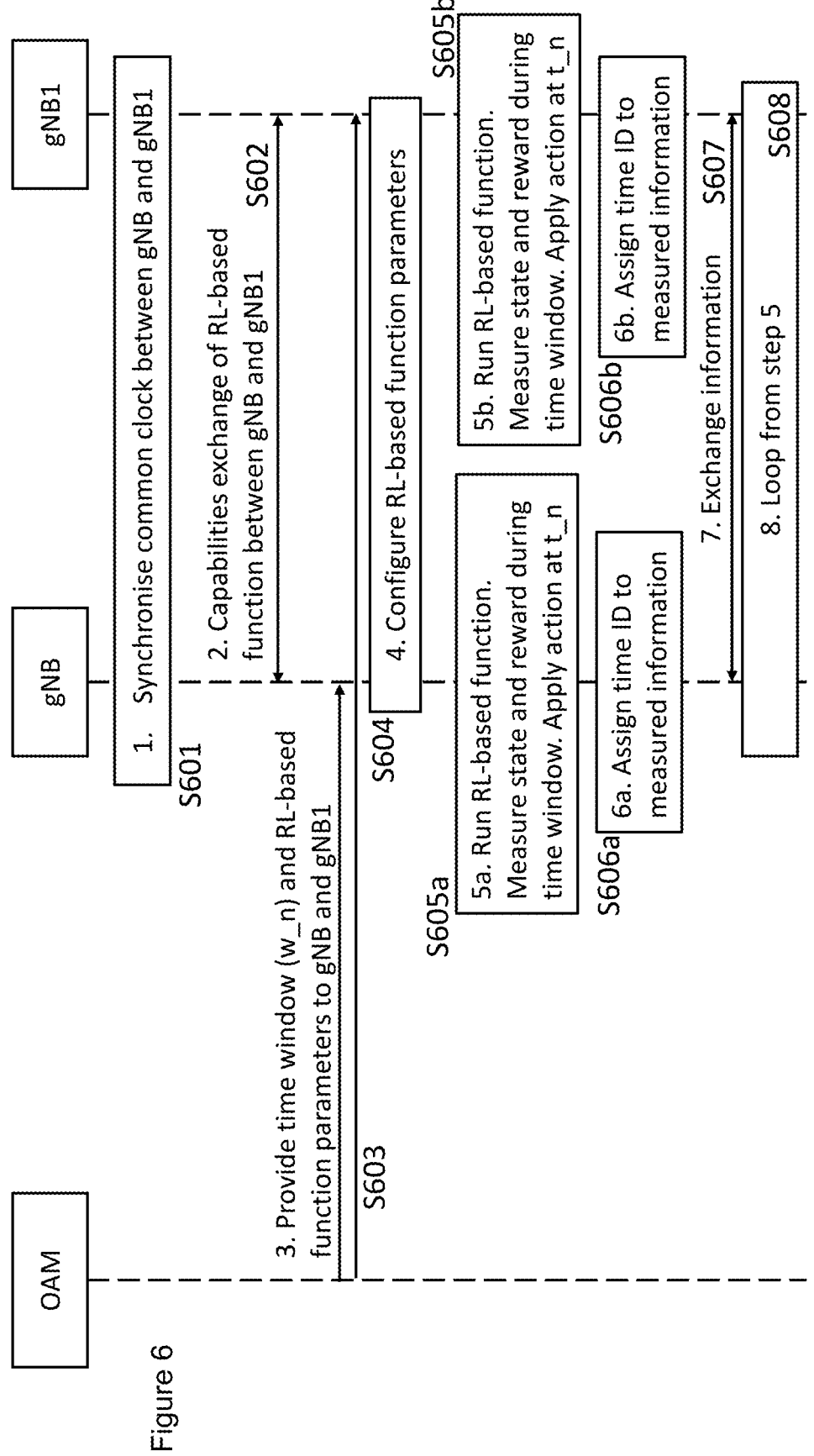
FIG. 6 shows an example signalling diagram between network entities.

FIG. 6 shows an example signalling diagram between network entities. The signalling takes place between OAM, a first gNB, and a second gNB.

In S601, the first gNB and the second gNB synchronise a common clock between the gNBs.

In S602, the first gNB and the second gNB exchange/share the respective capabilities of the gNBs related to an RL-based function. When one (or both) of the gNBs indicates a lack of capability related to the RL-based function, then the following steps may be terminated.

In this example, the ML function is an RL-based function. In other examples, the following method steps are applicable to other types of ML functions.

In S603, the OAM provides a time window and one or more parameters related to the RL-based function to the first gNB, and to the second gNB. In other examples, the time window and the one or more parameters may be pre-configured at the gNBs. In other examples, the time window and the one or more parameters may be determined by the first gNB, and provided to the second gNB.

The time window specifies a period of time between a first time instance and a second time instance (i.e. a first time window). The time window specifies a period of time between the second time instance and a third time instance (i.e. a second time window) and so on.

The one or more parameters may comprise at least one of: conditions to start and stop using the RL-based function (e.g. triggers or events), one or more reward/performance metric functions (and the reward/performance metric parameters), initialisation parameters (e.g. a Q-table or weights for a deep neural network), a fall back radio resource management mechanism if the RL-based function fails.

In S604, the first gNBs configures the RL-based function at the first gNB. The second gNB configures the RL-based function at the second gNB. The respective configurations may use at least one of: the time window, and the one or more parameters. In this way, the configurations of the RL-based function may be common to both the first and second gNBs.

In S605a, the first gNB runs the RL-based function. The RL-based function may be run as described alongside FIG. 5.

The first gNB obtains information by measuring: i) a state, and ii) a reward, using the RL-based function, during a (first) time window. At the end of the time window, the first gNB will perform an action. The action may be an action from a predetermined list of actions. The list of predetermined actions may have been configured as part of the RL-based function configuration, from S604.

In some examples, the first gNB may measure the reward (and not the state), during the time window/

In some other examples, for different ML-based functions, the first gNB may measure performance metrics other than a reward.

In S605b, in a similar manner to S605a, the second gNB runs the RL-based function.

In S606a, the first gNB assigns a time ID to the information measured during S605a. In some examples, a time ID is assigned to the information as a whole, measured during the (first) time window. In some examples, an individual time ID is assigned to the measured state, and the measured reward.

In S606b, in a similar manner to S606a, the second gNB assigns a time ID to the measured information. At the end of the time window, the second gNB will perform an action. The action may be an action from a predetermined list of actions. The list of predetermined actions may have been configured as part of the RL-based function configuration, from S604.

In S607, the first and the second gNBs exchanged their respective measured information for that (first) time window. The assigned time ID may also be provided alongside the information. The time ID may be provided as metadata alongside the information. The first and second gNBs may perform the exchange of information at the end of the time window.

In other examples, the first and second gNBs exchange the measured information according to (at least one) pre-defined rule associated with the time identification. For example, the time ID may not be provided with the measured information, but the measured information is sent at a predetermined time, the predetermined time associated with the time ID.

In S608, the signalling loops back to S605, whereby the first and second gNBs will run the RL-based function for the next time window. For example, the process may loop until a pre-determined time has elapsed. For example, the process may loop until further signalling from the OAM is received.

The first gNB may use the measured information (measured by the first gNB) and/or the received measured information for the RL-based function (at the first gNB). The second gNB may use the measured information (measured by the second gNB) and/or the received measured information for the RL-based function (at the second gNB). The information may be used to execute and/or train the RL-based function. The exchanged information may be used to determine how each gNB influences (or interferes with) the other gNB. For example, a gNB may change or alter how the gNB operates (e.g. changing transmission parameters or timings) when the gNB determines that there is interference with the other gNB.

In some other examples, one or more of the above steps may not be performed by either, or both, of the source and target nodes. Furthermore, one or more of the above steps may be performed in different orders.

Figure 7:
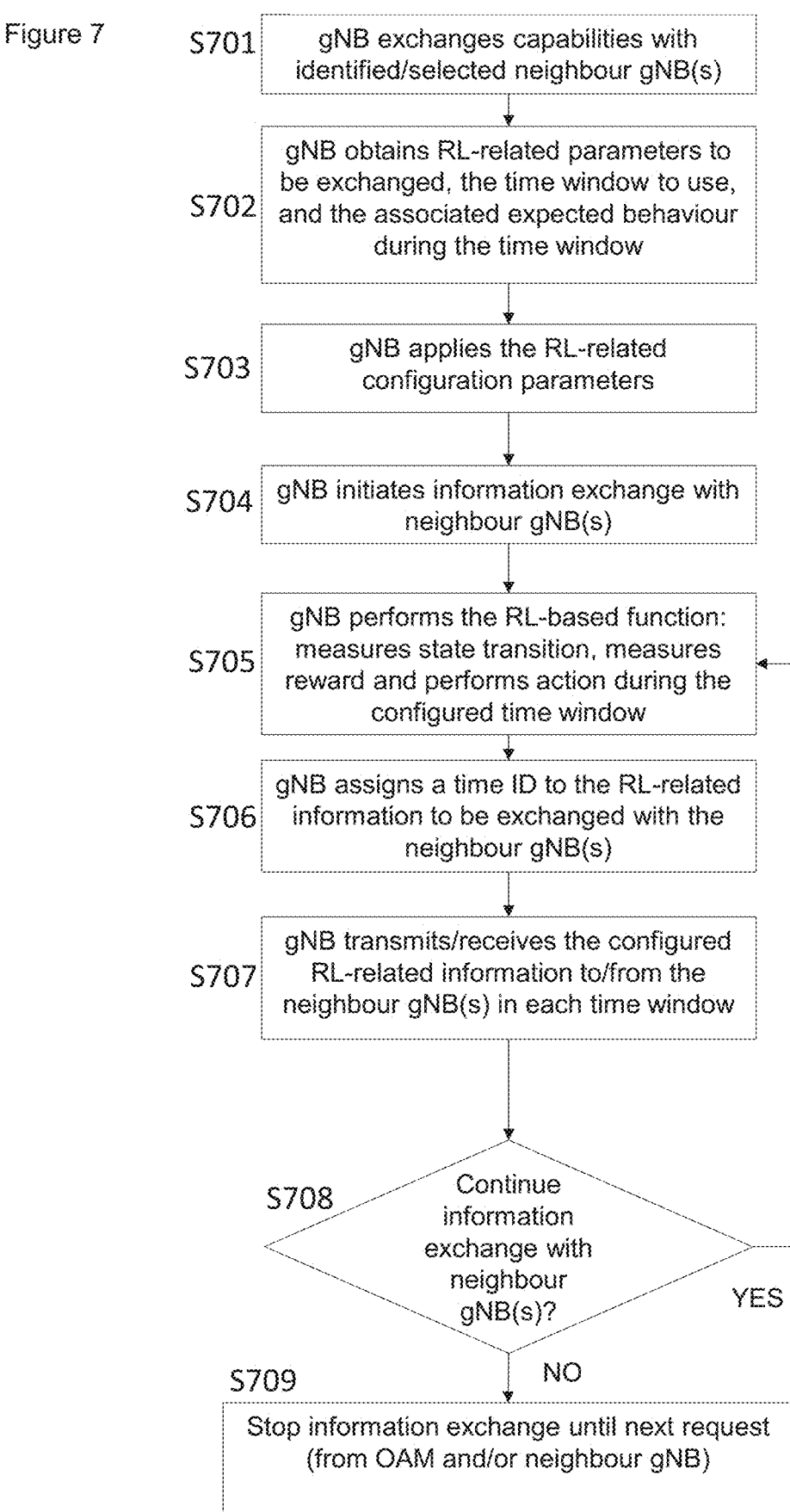
FIG. 7 shows an example method flow diagram performed by a network entity.

FIG. 7 shows an example method flow diagram performed by a communication node. In this example, the communicate node is a source node (gNB).

In S701, the gNB provides capabilities related to an RL-based function to one or more identified for selected neighbour gNBs. The gNB will, in turn, receive the capabilities of the one or more identified for selected neighbour gNBs.

In S702, the gNB obtains: a configuration of RL-related parameters to be exchanged, the time window to use, and associated expected behaviour during the time window. In examples, the gNB obtains the information from OAM.

In S703, the gNB applied the RL-related parameters to a configuration for the RL-based function at the gNB.

In S704, the gNB initiates an information exchange with the one or more neighbour gNBs. The information exchange is related to the RL-based function.

In S705, the gNB runs/operates the RL-based function by: measuring state transition during the time window, measuring a reward during the time window, and performing an action at the end of time window.

In S706, the gNB assigns a time ID to the RL-related information to be exchanged with the one or more neighbour gNBs.

In S707, the gNB transmits the measured RL-related information to the one or more neighbour gNBs. The transmission may occur at the end of the time window. At the same time, the gNB will receive the measured RL-related information from the one or more neighbour gNBs.

In S708, the gNB will determine whether to continue the information exchange with the one or more neighbour gNBs for the next time window.

When the determination is yes, the method flow will return to S705.

When the determination is no, the method flow will proceed to S709.

In S709, the gNB stops the information exchange. The gNB may begin the method flow again upon receiving a further request from OAM and/or neighbour gNBs.

In some examples, the configuration of the time window, w, includes a guard time period, $w_{guard}$. This means that, measurements of the state and reward are stopped at the guard time period before the next time instance i.e., $w_n=w-w_{guard}$. This guard time period may allow the gNB to have time to exchange the measured information with the one or more neighbour gNBs. The guard time period allows gNBs to use the measurements for inference, and apply actions at the end of the time window. For instance, if an agent/gNB needs the average resource block load during the time window, some time is needed to deliver the measurement for the other agent/gNB for inference purposes. Therefore, there exists a short period of time from which the state measurement/reward measurement is excluded. The duration of the time window and the guard period may be configured to mitigate any negative impacts of this.

In some examples, the configuration of the time window, w, may include a jitter time period, $w_{jitter}$. The jitter time period may also be referred to as an error time period. This means that the performed measurements and the information exchange will be shorter/longer than the 'regular' time window, i.e. $w_n \in [w-w_{jitter}, w+w_{jitter}]$. This jitter time period may provide an advantage when there are signalling delays between the source and target nodes. This is because the signalling delays may not be fully deterministic and may change depending on traffic load, mobility, etc. Examples for these scenarios are when one of the nodes is a UE, or when the source gNB is a non-terrestrial network node (e.g. a satellite, a high-altitude platform satellite, am unmanned aerial vehicle).

In some example, when the information received from one or more neighbour gNBs is received after the defined time window, then the information is disregarded for RL-based processing executed in the gNB. In this context, the information being disregarded means that the information is ignored/deleted/not used. This example may be implemented when a guard time period and/or jitter time period is configured as well.

In some other examples, one or more of the above steps may not be performed by either, or both, of the source and target nodes. Furthermore, one or more of the above steps may be performed in different orders.

There are a number of use cases that may be applicable for the mechanisms discussed above. An example use case is related to uplink outer-loop power control, whereby time synchronized co-operation between neighbour cells may lead to a number of benefits. The co-operation between the neighbour cells allows each cell to know how much interference they are causing for nearby cells. If rewards are not collected exactly from time windows where certain power control parameters are used, then can be equivalent to having 'noise' in rewards. Some inaccuracy may be tolerated in rewards, but when a reward 'noise rate' is increased, performance is decreased. This may be equivalent to increasing inaccuracies in the time window between neighbouring cooperative gNBs, as discussed in examples above. If inaccuracies in the rewarding is too large, then RL learning may be difficult/non-useful.

As an example, cell specific P0 values are configured for one or more UEs within each cell. In 3GPP, 'P0' is the UL target received power density at a serving gNB. Each gNB has its own machine learning based function using a double deep Q network (DDQN) that aims to maximize the cell's uplink throughput. A double deep Q-network utilises double 'Q-learning' to reduce overestimation by decomposing a max operation in a target into action selection and action evaluation. Each gNB shares RL-based function parameters with the neighbour gNBs as illustrated in FIG. 8.

Figure 8:
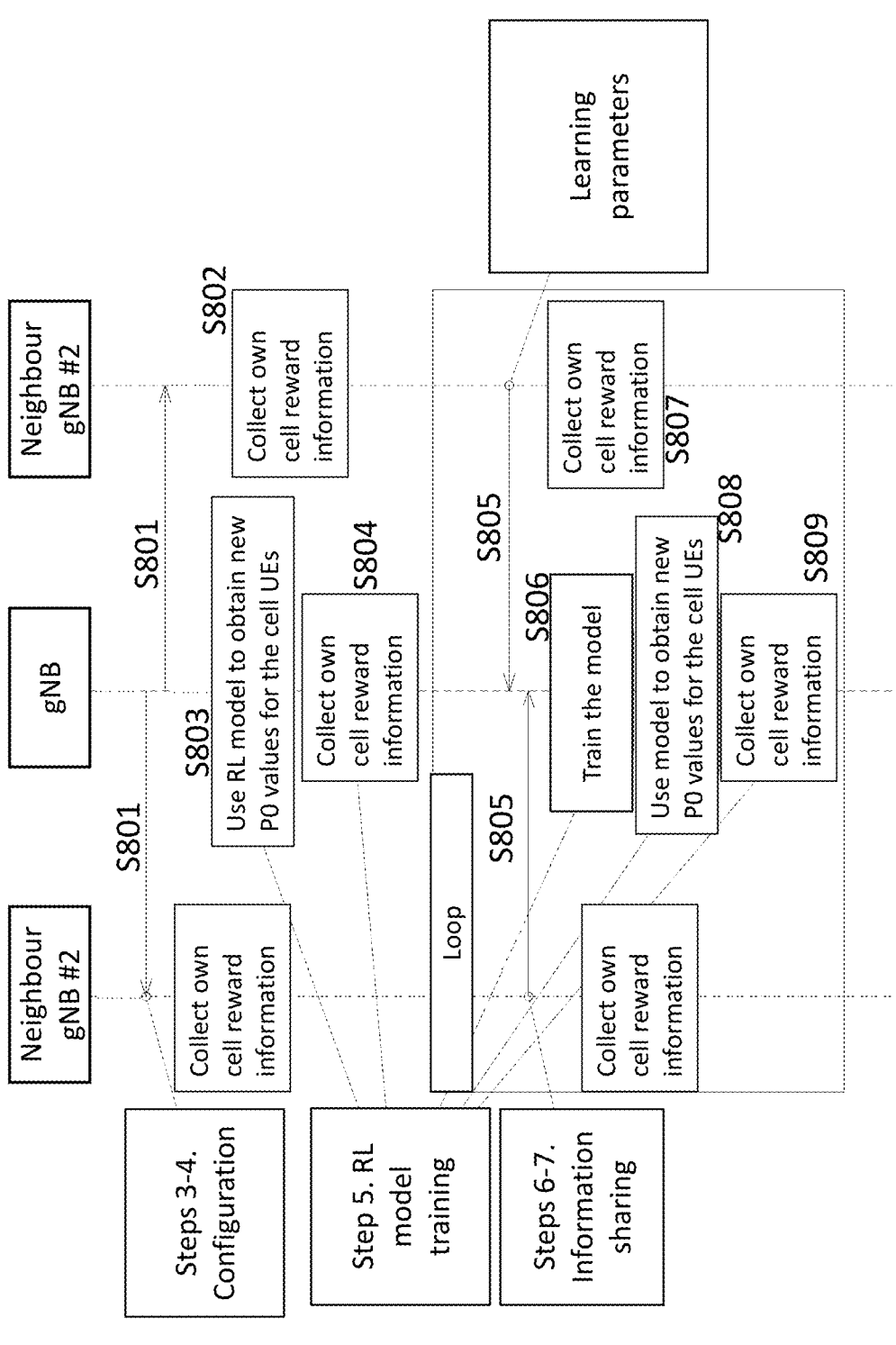
FIG. 8 shows an example message sequence chart illustrating a power control use case.

FIG. 8 shows an example message sequence chart illustrating a power control use case. In the example of FIG. 8, there is a single gNB with two other neighbour gNBs.

In S801, the gNB agrees a configuration with the neighbour gNBs including a starting time and periodicity (i.e. time window), associated with an RL-based function. The provision of the configuration to the neighbour gNBs may be via Xn/F1. This allows a mapping of reward information/state information between the three gNBs to the correct action made by gNB. This mapping allows each gNB to learn the effects of its actions on the neighbouring gNBs. Closest neighbour gNBs are those that are most likely impacted from gNBs uplink power control parameter decisions. In this example, gNB-to-gNB propagation measurements are used to determine pathloss between gNBs. A configured pathloss threshold is used to determine whether a certain gNB is considered to be a neighbour or not, in this example.

The neighbour gNBs use the time window to configure their RL-based function, with a start time and a periodicity.

In S802, the neighbour gNBs run the RL-based function and measure/collect a reward associated with the RL-based function.

In S803, the gNB uses the RL-based function to obtain new P0 values for the cell UEs.

In S804, the gNB run the RL-based function and measure/collect a reward associated with the RL-based function.

In S805, the neighbour gNBs provide their measured information to the gNB. The measured information may also be referred to as learning parameters. The neighbour gNBs may provide the information via Xn/F1. The measured information may comprise measured reward information of the neighbour gNB. For example, a mean (or sum) user throughput and/or a mean packet latency. The measured information may also comprise state information measured by the neighbour gNBs. For example, power control values such as P0 used by the neighbour gNBs.

In S806, the gNB may train the RL-based function at a current state with the measured rewards (from S804). The gNB may also train the RL-based function using the received reward and/or state information from the neighbour gNBs.

Steps S807 to S809 are the same as steps S802 to S804, but for the next time window occasion.

S805 to S809 can be looped as long as the configured periodicity is still valid.

In this way, each of the three gNBs collects, periodically, reward information (e.g. a sum of user throughputs from each neighbouring gNBs) and uses the sum of those collected values as a reward for previously made P0 configuration action. By doing so, the impact of the neighbour gNBs is taken into account (e.g. interference). This may allow for a maximization of network level performance. Additionally, state related information (measured by each gNB during a time window) may be collected and shared. The state information from the neighbour gNBs may be combined with state information of the gNB to get a more comprehensive input vector for a neural network.

In a reinforcement learning scenario, a gNB may be referred to as an agent, as discussed in FIGS. 4a and 4b. When an agent in a multi-agent environment is not synchronised (e.g. with respect to timing) with the other agents, then the influence of an action taken by a non-synchronised agent cannot be evaluated by the other agents. This is demonstrated in FIG. 9.

FIG. 9 shows a schematic representation of multi-agent synchronisation.

In the example of FIG. 9, there is provided three agents including: a first agent 901, a second agent 903, and a third agent 905. Each agent has an associated environment, such that the first agent 901 has a first environment 907, the second agent 903 has a second environment 909, and the third agent 905 has a third environment 911. Each of the three agents 901, 903, 905 have overlapping environments 907, 909, 911. Therefore, the three agents 901, 903, 905 may consider their influence on their neighbouring agents.

In this example, it is assumed that the first agent 901 and the third agent 905 are synchronized as per examples described previously (e.g. FIG. 7). By defining configuration between the first 901 and third 905 agents, such as a time window, synchronizing action steps, and associating rewards with the time window, the first agent 901 is capable of receiving measurements from the third agent 1005 which are measured during the time window when the action was applied, and vice versa. However, since the second agent 903 is not synchronized, and does not have the defined time window, the measurements by the second agent 1003 might overlap with the two actions from the first 901 and third 905 agents.

As seen in FIG. 10, the timing of the first agent 901 and the third agent 905 are aligned at time instances $t_0$ 951, $t_1$ 953, and $t_2$ 955. The timing is aligned as the first agent 901 and the third agent 905 have synchronised their RL-based functions. However, as seen in FIG. 9, the timing of the second agent 903 does not align with the timing of the first agent 901 and the third agent 905.

Therefore, an evaluation of the impact of the actions of second agent 903 at the first agent 901 and the third agent 905 is not possible. Any information collected from the second agent 903 would not be useful.

FIG. 10 shows an example method flow performed by an apparatus. The apparatus may be comprised within a communication node. In an example, the communication node may be a base station or gNB.

In S1001, the method comprises synchronising a common reference timing with a second communication node.

In S1003, the method comprises obtaining an indication of a time window, wherein the time window specifies a period of time between a first time instance and a second time instance.

In S1005, the method comprises configuring a machine learning-based function at the first communication node, wherein the configuration of the machine learning-based function is common between the first and second communication nodes.

In S1007, the method comprises executing the machine learning-based function.

In S1009, the method comprises obtaining information by measuring a performance metric, for the machine learning-based function, during the time window.

In S1011, the method comprises assigning a time identification to the measured information during the time window, wherein the time identification is associated with the common reference timing.

In S1013, the method comprises providing, to the second communication node, the measured information according to the time identification.

FIG. 11 shows an example method flow performed by an apparatus. The apparatus may be comprised within a communication node. In an example, the communication node may be a base station or gNB or UE.

In S1101, the method comprises synchronising a common reference timing with a first communication node.

In S1103, the method comprises obtaining an indication of a time window, wherein the time window specifies a period of time between a first time instance and a second time instance.

In S1105, the method comprises configuring a machine learning-based function at the second communication node, wherein the configuration of the machine learning-based function is common between the first and second communication nodes.

In S1107, the method comprises executing the machine learning-based function.

In S1109, the method comprises obtaining information by measuring a performance metric, for the machine learning-based function, during the time window.

In S1111, the method comprises assigning a time identification to the measured information during the time window, wherein the time identification is associated with the common reference timing.

In S1113, the method comprises receiving, from the first communication node, further measured information according to the time identification.

FIG. 12 shows a schematic representation of non-volatile memory media 1200a (e.g. computer disc (CD) or digital versatile disc (DVD)) and 1200b (e.g. universal serial bus (USB) memory stick) storing instructions and/or parameters 1202 which when executed by a processor allow the processor to perform one or more of the steps of the methods of FIG. 10 or FIG. 11.

It is noted that while the above describes example embodiments, there are several variations and modifications which may be made to the disclosed solution without departing from the scope of the present invention.

The examples may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The examples may be implemented by computer software stored in a memory and executable by at least one data processor of the involved entities or by hardware, or by a combination of software and hardware. Further in this regard it should be noted that any procedures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples.

Alternatively, or additionally some examples may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:

(a) hardware-only circuit implementations (such as implementations in only analogue and/or digital circuitry);

(b) combinations of hardware circuits and software, such as:

(i) a combination of analogue and/or digital hardware circuit(s) with software/firmware and (ii) any portions of hardware processor(s) with software (including digital signal processor(s)), software, and memory(ies) that work together to cause an apparatus, such as the communications device or base station to perform the various functions previously described; and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments. However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

The invention claimed is:

1. An apparatus for a first communication node, the apparatus comprising one or more processors, and memory storing instructions that, when executed by the one or more processors, cause the apparatus to perform:
    synchronising a common reference timing with a second communication node;
    obtaining an indication of a time window, wherein the time window specifies a period of time between a first time instance and a second time instance;
    configuring a machine learning-based function at the first communication node, wherein the configuration of the machine learning-based function is common between the first and second communication nodes;
    executing the machine learning-based function;
    obtaining information by measuring a performance metric, for the machine learning-based function, during the time window;
    assigning a time identification to the measured information during the time window, wherein the time identification is associated with the common reference timing; and
    providing, to the second communication node, the measured information according to the time identification,
    wherein the apparatus is caused to obtain information by:
        obtaining the information by measuring: i) the performance metric, and ii) a state, for the machine learning-based function, during the time window.

2. The apparatus according to claim 1, wherein the instructions, when executed by the one or more processors, further cause the apparatus to perform:
    applying an action at the second time instance, wherein an effect of the action is measured by the first communication node during a subsequent time window.

3. The apparatus according to claim 1, wherein the apparatus is caused to provide the measured information by providing, to the second communication node, the measured information with the time identification and providing, to the second communication node, the measured information according to a pre-defined rule associated with the time identification.

4. The apparatus according to claim 1, wherein the instructions, when executed by the one or more processors, further cause the apparatus to perform:
    receiving, from the second communication node, further measured information with the time identification associated with the machine learning-based function, wherein the further measured information: is measured by the second communication node for the machine learning-based function, and is associated with the time window.

5. The apparatus according to claim 4, wherein the instructions, when executed by the one or more processors, further cause the apparatus to perform:
    using at least one of: the measured information, and the further measured information, to execute the machine learning-based function at the first communication node.

6. The apparatus according to claim 4, wherein the instructions, when executed by the one or more processors, further cause the apparatus to perform:
    determining whether the further measured information is received during the time window; and
    in response to determining that the further measured information is received outside of the time window, disregarding the further measured information that is received.

7. The apparatus according to claim 1, wherein the instructions, when executed by the one or more processors, further cause the apparatus to perform:
    obtaining a guard time period associated with the time window, the guard time period defining a time period before the second time instance that measurements of the state and performance metric are to be stopped.

8. The apparatus according to claim 1, wherein the instructions, when executed by the one or more processors, further cause the apparatus to perform:
    associating performance metrics with the time identification of the measured information between the first and second communication nodes, when the machine learning-based function is configured at the first communication node and the second communication node.

9. An apparatus for a second communication node, the apparatus comprising one or more processors, and memory storing instructions that, when executed by the one or more processors, cause the apparatus to perform:
    synchronising a common reference timing with a first communication node;
    obtaining an indication of a time window, wherein the time window specifies a period of time between a first time instance and a second time instance;
    configuring a machine learning-based function at the second communication node, wherein the configuration of the machine learning-based function is common between the first and second communication nodes;
    executing the machine learning-based function;
    obtaining information by measuring a performance metric, for the machine learning-based function, during the time window;
    assigning a time identification to the measured information during the time window, wherein the time identification is associated with the common reference timing; and receiving, from the first communication node, further measured information according to the time identification, wherein the apparatus is caused to obtain information by:
obtaining the information by measuring: i) the performance metric, and ii) a state, for the machine learning-based function, during the time window.

10. A method in an apparatus for a first communication node, the method comprising:

synchronising a common reference timing with a second communication node;

obtaining an indication of a time window, wherein the time window specifies a period of time between a first time instance and a second time instance;

configuring a machine learning-based function at the first communication node, wherein the configuration of the machine learning-based function is common between the first and second communication nodes;

executing the machine learning-based function;

obtaining information by measuring a performance metric, for the machine learning-based function, during the time window;

assigning a time identification to the measured information during the time window, wherein the time identification is associated with the common reference timing; and providing, to the second communication node, the measured information according to the time identification, wherein the apparatus is caused to obtain information by:

obtaining the information by measuring: i) the performance metric, and ii) a state, for the machine learning-based function, during the time window.

11. A method in an apparatus for a second communication node, the method comprising:

synchronising a common reference timing with a first communication node;

obtaining an indication of a time window, wherein the time window specifies a period of time between a first time instance and a second time instance;

configuring a machine learning-based function at the second communication node, wherein the configuration of the machine learning-based function is common between the first and second communication nodes;

executing the machine learning-based function;

obtaining information by measuring a performance metric, for the machine learning-based function, during the time window;

assigning a time identification to the measured information during the time window, wherein the time identification is associated with the common reference timing; and receiving, from the first communication node, further measured information according to the time identification, wherein the apparatus is caused to obtain information by:
obtaining the information by measuring: i) the performance metric, and ii) a state, for the machine learning-based function, during the time window.

\* \* \* \* \*